United States Patent
Fujioka et al.

(10) Patent No.: US 6,650,084 B2
(45) Date of Patent: Nov. 18, 2003

(54) MOTOR DRIVER

(75) Inventors: Nobuyoshi Fujioka, Kyoto (JP); Keishi Oto, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/966,796

(22) Filed: Sep. 28, 2001

(65) Prior Publication Data

US 2002/0125853 A1 Sep. 12, 2002

(30) Foreign Application Priority Data

Oct. 13, 2000 (JP) .......................... 2000-313344

(51) Int. Cl.[7] ................ H02P 1/46; H02P 7/36
(52) U.S. Cl. ............ 318/705; 318/138; 318/254; 318/439; 318/599; 318/700; 318/716
(58) Field of Search .................. 318/138, 254, 318/439, 700, 705, 716, 599, 811, 720

(56) References Cited

U.S. PATENT DOCUMENTS

| | | | | |
|---|---|---|---|---|
| 4,874,993 A | * | 10/1989 | Tanaka et al. | 318/254 |
| 5,717,299 A | * | 2/1998 | Imagaki et al. | 318/254 |
| 5,767,654 A | * | 6/1998 | Menegoli et al. | 318/811 |
| 5,869,944 A | * | 2/1999 | Tanina | 318/599 |
| 6,111,372 A | * | 8/2000 | Nishimura | 318/254 |
| 6,242,875 B1 | * | 6/2001 | Kusaka et al. | 318/254 |
| 6,316,894 B2 | * | 11/2001 | Hashimura | 318/439 |
| 6,483,270 B1 | * | 11/2002 | Miyazaki et al. | 318/700 |

* cited by examiner

Primary Examiner—Robert E. Nappi
Assistant Examiner—Tyrone Smith
(74) Attorney, Agent, or Firm—Beyer Weaver & Thomas LLP

(57) ABSTRACT

A motor driver generates a signal synchronized with the rotation of a three-phase by comparing each of induction voltages generated in the motor's coils with a specified standard voltage. A triangular wave signal is generated such that its frequency increases with the speed of rotation of the motor increases. A standard value is set according to a change in the amplitude of the triangular wave signal and a noise mask signal is generated by comparing this standard value with the triangular wave signal. Noise is removed from the synchronized signals by using the noise mask signal, and currents are supplied to the coils of the motor by using the synchronized signals from which noise has been removed. With such a motor driver, noise can be effectively eliminated because both the noise mask time and the position detecting time can be varied gently.

5 Claims, 14 Drawing Sheets

FAST ROTATION

SLOW ROTATION

MOTOR DRIVER

BACKGROUND OF THE INVENTION

This invention relates to a motor driver for driving a three-phase brushless motor.

Sensorless motor drivers not using a sensor such as a Hall element for phase detection are used as a motor driver for driving a brushless motor for rotating the cylinder of a video tape recorder or the spindle of a floppy disk drive. Conventional sensorless motor drivers are switched on and off such that the currents passing through the coils of the brushless motor will each have a rectangular waveform with phase differences of 120° as shown in FIG. 1, and the angular position (phase) of the rotor of the motor is detected during its off time (of phase period of 60°). Motor drivers which are switched on and off in this manner have the problem of generating noise in the motor while the motor is rotating. Since the current passing through the motor changes suddenly with a mode of switching of this kind, noise is generated by the induction voltages generated in coils (hereinafter referred to simply as the noise) whenever the on-off condition of a current changes (or at moments when the polarity of a passing current changes) as shown in FIG. 2. Since such noise is superposed onto detection signals for the motor position, the rotation of the motor becomes unstable.

In view of problems of this kind, motor drivers for passing currents through coils over 150° in phase with sloped current waveform have been considered. With this mode of operation, as shown in FIG. 3 where the mode of operation by passing current over 120° in phase is shown by broken lines, currents are passed smoothly over 150° in phase and the angular position of the rotor of the brushless motor is detected during periods of 30° in phase. Since the waveform by this mode of operation is sloped and the currents through the coils change gradually, the noise of the motor during its rotation can be made smaller, but there is a limit to how much the noise can be reduced and, as shown in FIG. 4, there still is substantial noise even by this mode of operation with currents passed over 150° in phase while the brushless motor rotates. Noise is smaller in this case than if the current is passed over 120° but the situation is still the same in that the rotation of the motor is made unstable by the noise.

In order to address this problem of noise, it has been known to generate a so-called noise mask signal in order to prevent the noise of the coils from passing through. Since noise is generated when the on-off condition of the currents is changed, or at moments when the polarity of a current is reversed, noise mask signals are generated at this timing, as shown in FIG. 5, such that the noise will not be transmitted to the drive signal synthesizing circuit for controlling the currents through the individual coils during the periods (herein referred to as the noise mask periods) while a noise mask signal is being generated. Since the timing of the generation of noise can be determined by the signals outputted from this drive signal synthesizing circuit, the mask signal generating circuit charges and discharges a capacitor, uses a comparator to detect its charging and discharging voltages and makes use of the time required for the capacitor to charge and discharge to thereby determine the noise mask period for the noise mask signal.

Let us assume that the charge-discharge voltage of the capacitor, adapted to charge and discharge as the rotor rotates, varies as shown in FIG. 6 (by Graph (a)) with a triangular waveform. The comparator compares it with a standard voltage $V_S$ at a constant level and a low-level mask signal is generated as shown in FIG. 6 (by Graph (b)) during the periods in which the charge-discharge voltage is higher than the standard voltage $V_S$. Thus, if the speed of rotation of the motor is increased, the noise mask time becomes accordingly shorter but the detection time for the angular position between two successive noise mask signals is constant, independent of the speed of rotation of the motor. Methods of this kind have been disclosed, for example, in Japanese Patent Publication Tokkai 5-344782, 6-311784 and 8-33382.

If the speed of rotation of the motor is increased and the period of the cycle of the triangular voltage waveform becomes short, as shown in FIG. 6 (by Graph (c)), however, the noise mask time becomes correspondingly short as shown in FIG. 6 (by Graph (d)) and hence it becomes impossible to remove the noise. As a result, the rotary motion of the motor becomes unstable.

This problem can be solved if the standard voltage $V_s$ for comparing with the charge-discharge voltage is made smaller such that the noise mask time can be sufficiently long. If the noise mask time is made longer, however, the detection time for detecting the angular position of the rotor of the brushless motor becomes shorter. As a result, it may become impossible to detect the angular position of the rotor and to drive the brushless motor properly.

SUMMARY OF THE INVENTION

It is therefore an object of this invention, in view of the problems of the prior art technology described above, to provide a motor driver capable of gradually adjusting the noise mask time and the time for detecting according to the speed of rotation of a brushless motor.

A motor driver according to an embodiment of this invention for driving a three-phase motor may be characterized as comprising a synchronized signal generating means for generating signals which are synchronized with the rotation of the motor by comparing each of induction voltages generated in the coils of the motor with a specified standard voltage, a triangular wave signal generating means for generating a triangular wave signal, the frequency of the triangular wave signal increasing as the speed of rotation of the motor increases, a noise mask signal generating means for varying a standard value according to a change in the amplitude of the triangular wave signal and generating a noise mask signal by comparing this standard value with the triangular wave signal, a noise mask means for removing noise from the synchronized signals by using the noise mask signal, and a current supplying means for supplying currents to the coils of the motor by using the synchronized signals from which noise has been removed by the noise mask means. With a motor driver thus structured, noise can be effectively eliminated because both the noise mask time and the position detecting time can be varied gently. The rotation of the motor can also be stabilized because the noise mask time can be prevented from becoming short abruptly even if the speed of rotation of the motor is increased. According to one embodiment of the invention, the standard value which is used by the noise mask generating means is maintained to be at a constant ratio with respect to the amplitude of the triangular wave signal and hence can be obtained by a simple calculation and increased or decreased according to the amplitude of the triangular wave signal.

According to another embodiment of the invention, the induction voltages in the three coils of the motor are compared with a single specified standard voltage. This serves to eliminate the variations among the three phases of the synchronized signals and stabilize the rotation of the motor.

According to still another embodiment of the invention, the currents to be supplied to the coils are arranged not only to have a sloped portion but also such that the slope of this sloped portion will decrease as the rotation of the motor becomes slower. Even with such a sloped portion provided in order to vary the coil current gently, if the slope of this sloped portion is constant, independent of the speed of rotation of the motor, the slope of the sloped portion becomes relatively sharp as the speed of rotation of the motor decreases and the waveform approaches a rectangle. According to this embodiment of the invention, the slope of the sloped portion is caused to gentler as the speed of rotation of the motor becomes low such that noise can be eliminated even when the motor is rotating slowly.

Still another motor driver embodying this invention may be characterized as being different from the motor driver described above wherein the triangular wave signal is generated such that not only its frequency but the rate of its increase becomes larger as the speed of rotation of the motor is increased and that the triangular wave signal thus generated is compared with a specified standard value to generate the noise mask signal. A motor driver thus structured is also capable of changing both the noise mask time and the position detection time gently according to the speed of rotation of the motor. Even if the speed of rotation of the motor increases, the noise mask time can be prevented from becoming short abruptly.

Many of the inventive elements described above can be combined in a single embodiment.

DETAILED DESCRIPTION OF THE INVENTION

The invention is described next by way of examples.

Figure 1:
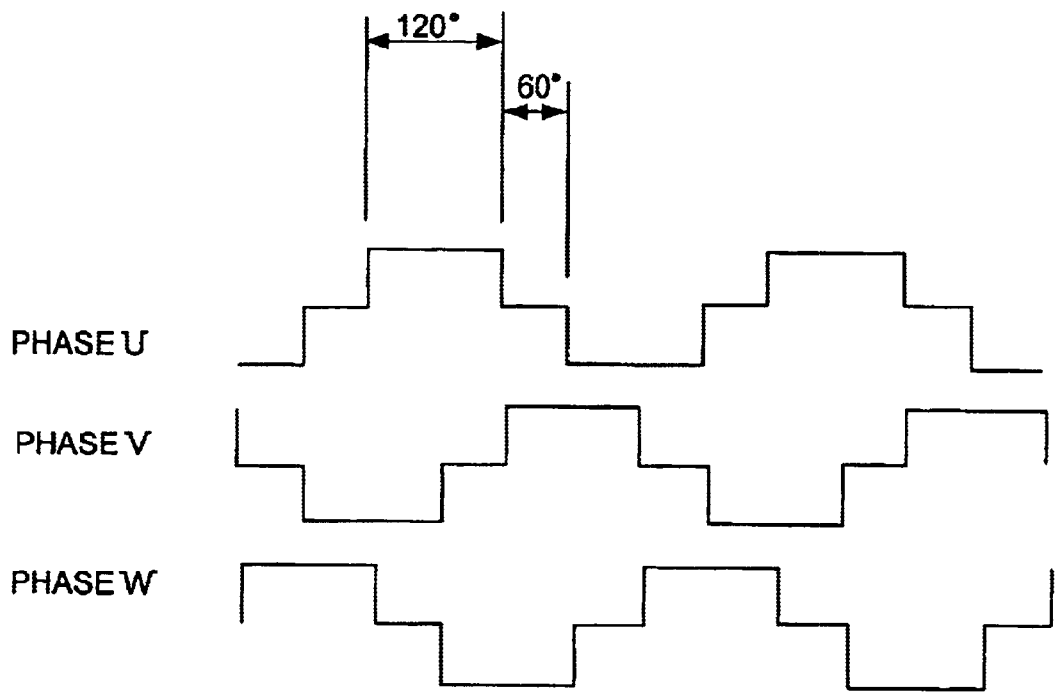
FIG. 1 is a waveform diagram showing a conventional 120° current-passing mode of operation of a three-phase motor.
Figure 2:
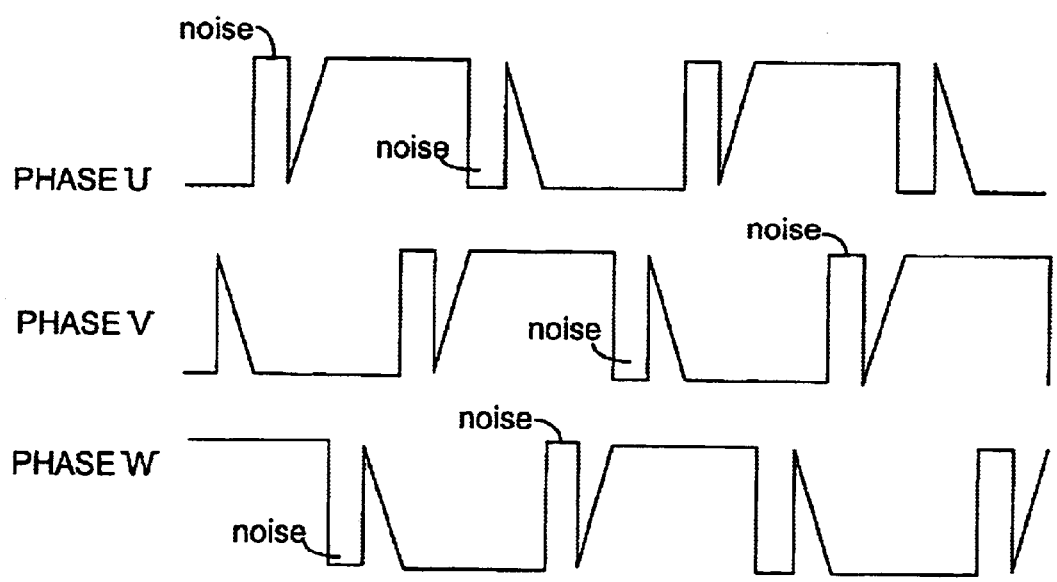
FIG. 2 is a waveform diagram showing the noise that is generated in the three-phase waveform in the 120° current-passing mode of operation of FIG. 1.
Figure 3:
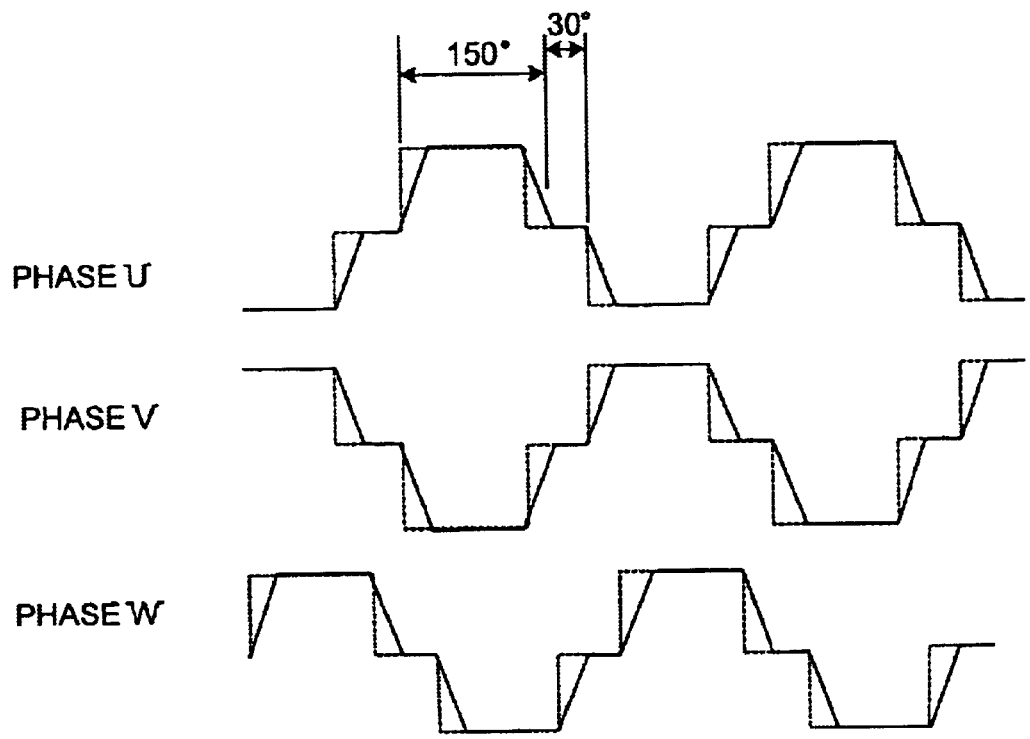
FIG. 3 is a waveform diagram showing a conventional 150° current-passing mode of operation of a three-phase motor.
Figure 4:
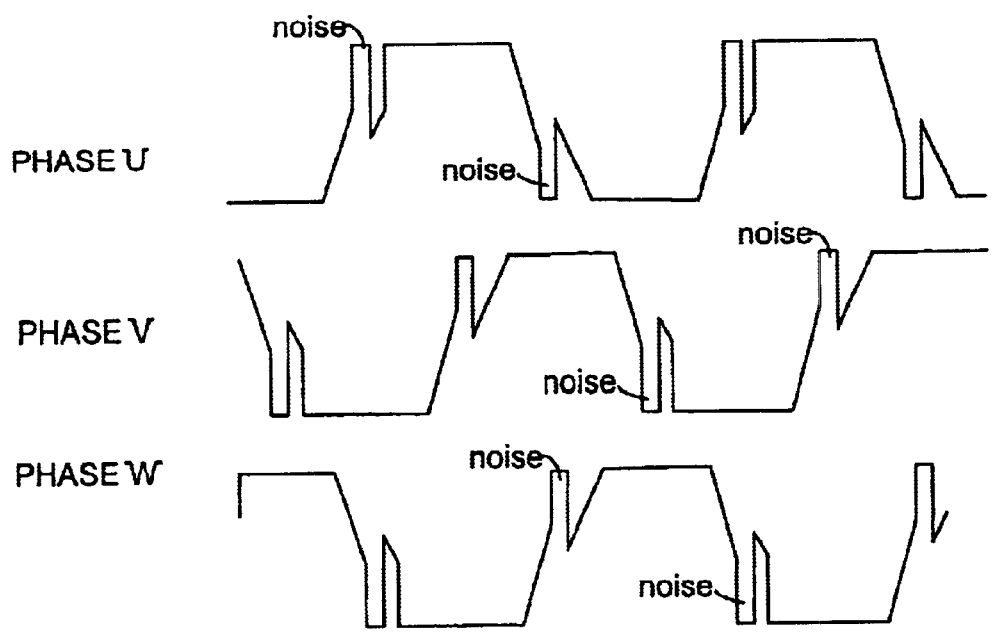
FIG. 4 is a waveform diagram showing the noise that is generated in the three-phase waveform in the 150° current-passing mode of operation of FIG. 3.
Figure 5:
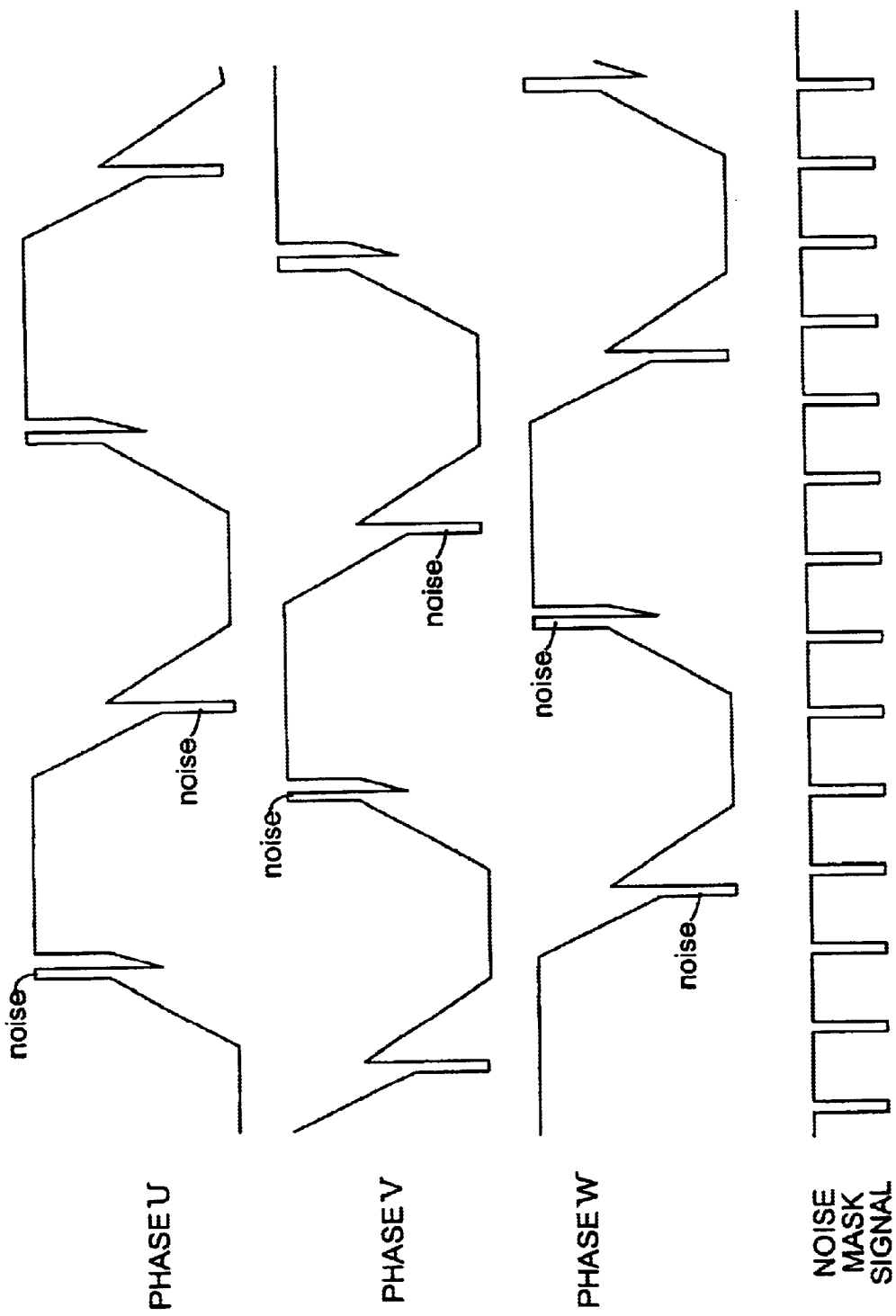
FIG. 5 is a waveform diagram showing the relationship between the noise generated in a three-phase waveform and a noise mask signal.
Figure 6:
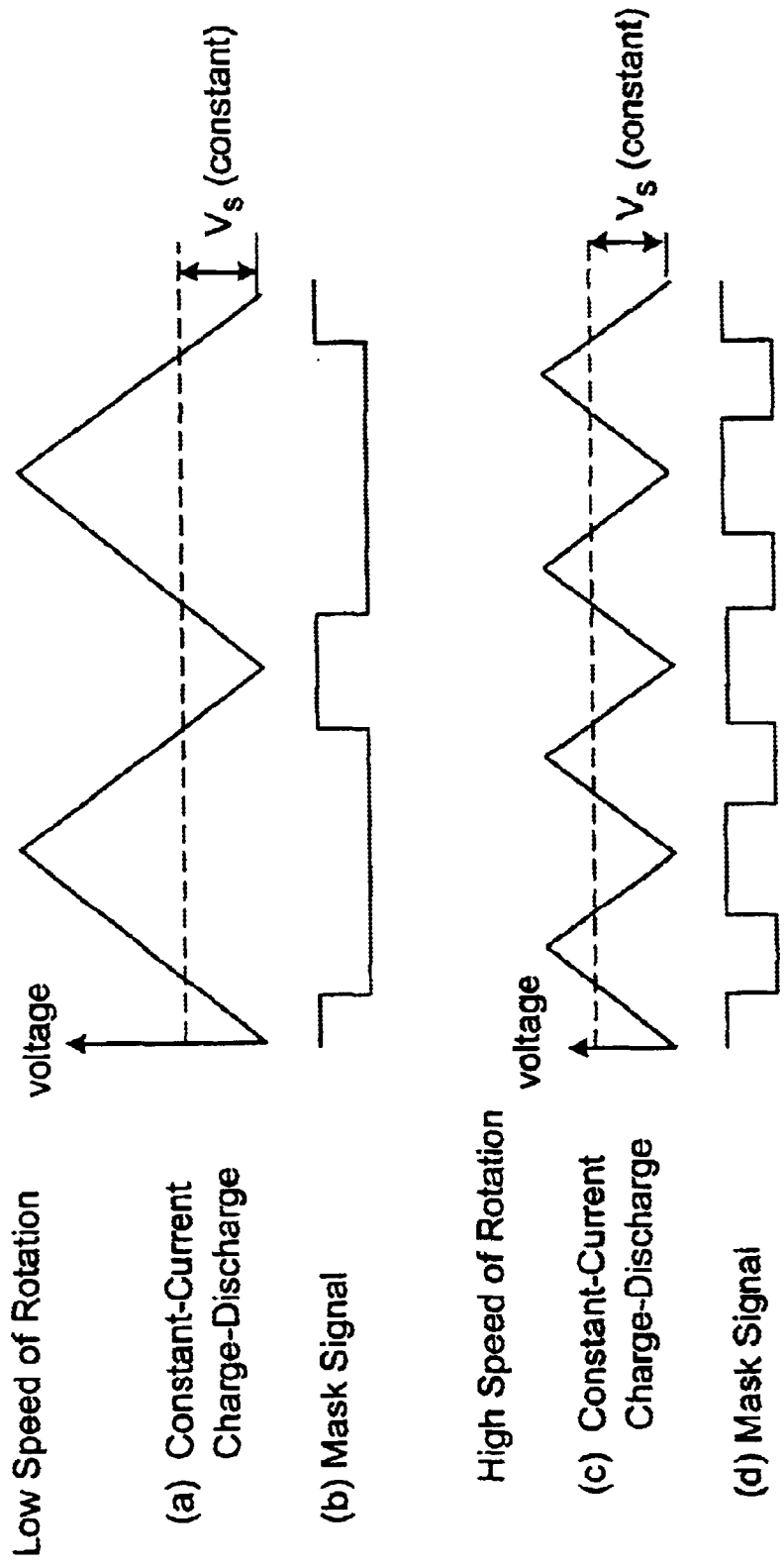
FIG. 6 presents waveform diagrams of constant-current charge-discharge and mask signal when the speed of rotation of the motor is fast and slow.
Figure 7:
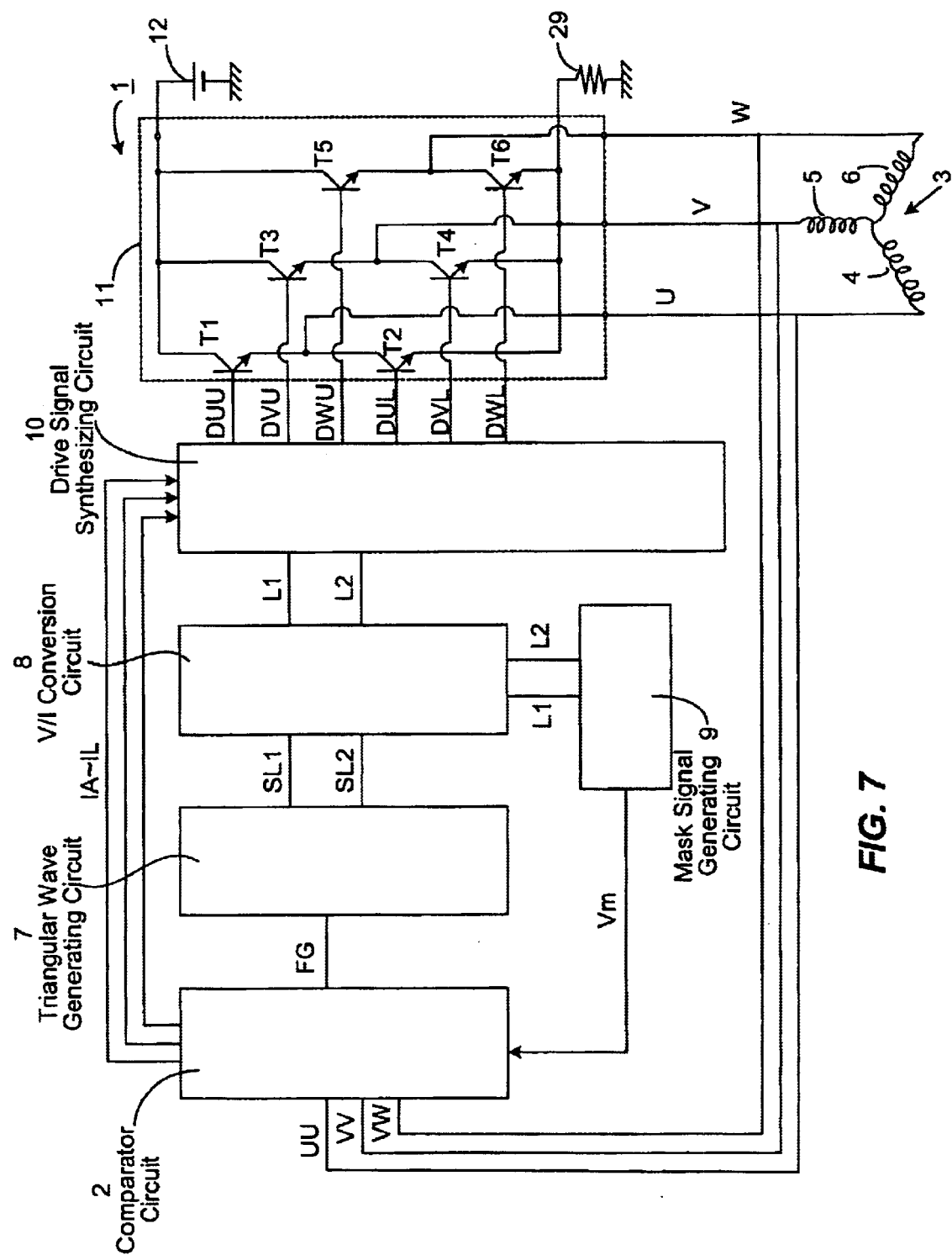
FIG. 7 is a block circuit diagram of a sensorless motor driver 1 according to a first embodiment of this invention.
Figure 11:
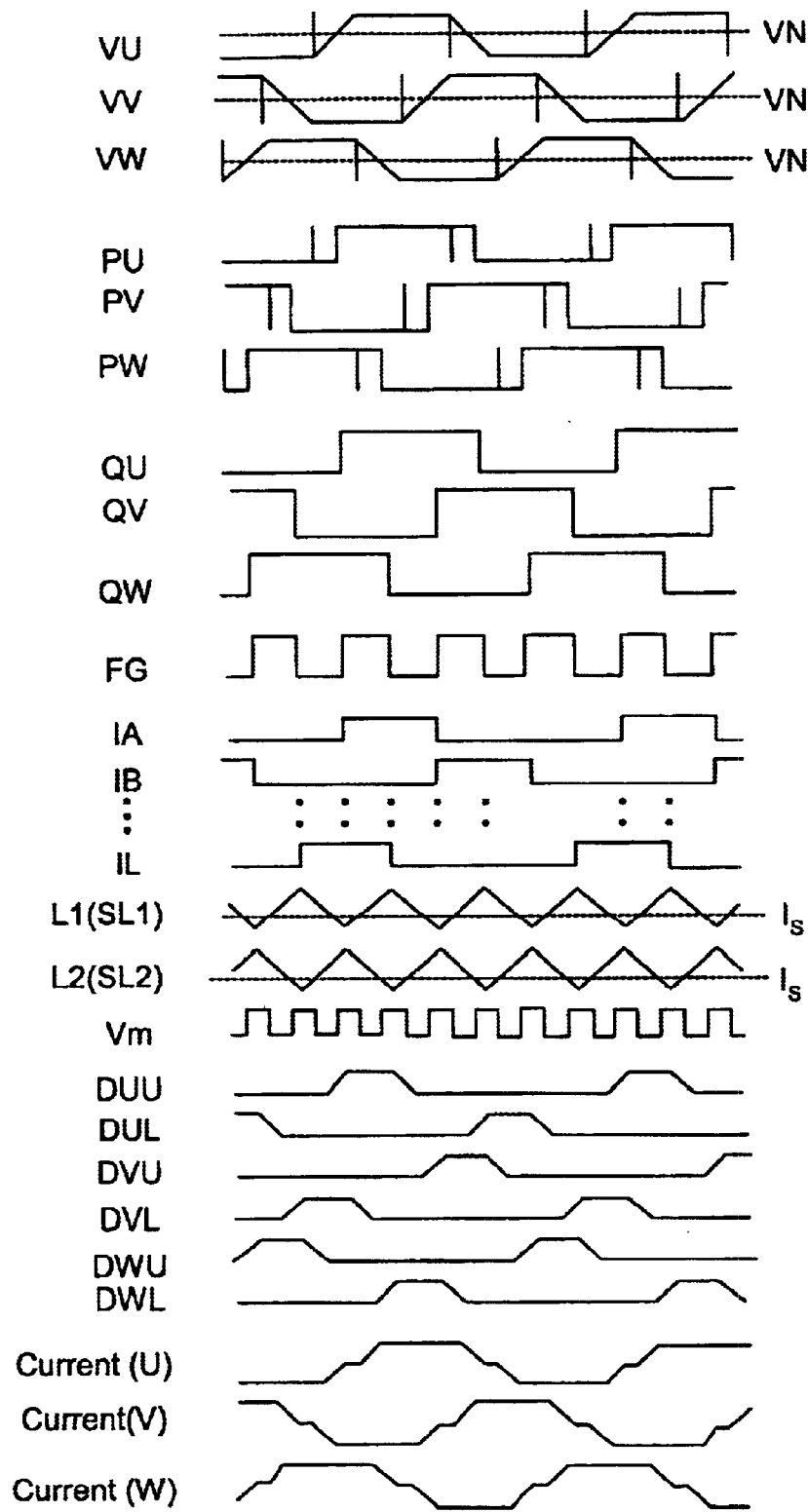
FIG. 11 is a waveform diagram showing waveforms of signals through various components shown in FIG. 7.

FIG. 7 is a block circuit diagram of a sensorless motor driver 1 according to a first embodiment of this invention for a three-phase brushless motor 3, and FIG. 11 shows the waveforms of currents and voltages at various parts shown in the block circuit diagram of FIG. 7. The brushless motor 3 has three coils 4, 5 and 6 respectively for its U-phase, V-phase and W-phase, and the motor driver 1 is adapted to detect the angular position of the rotor of the brushless motor 3 from the induction voltages VU, VV and VW generated respectively in these coils 4, 5 and 6. The waveforms of these induction voltages VU, VV and VW are shown in FIG. 11 and include noise.

Figure 8:
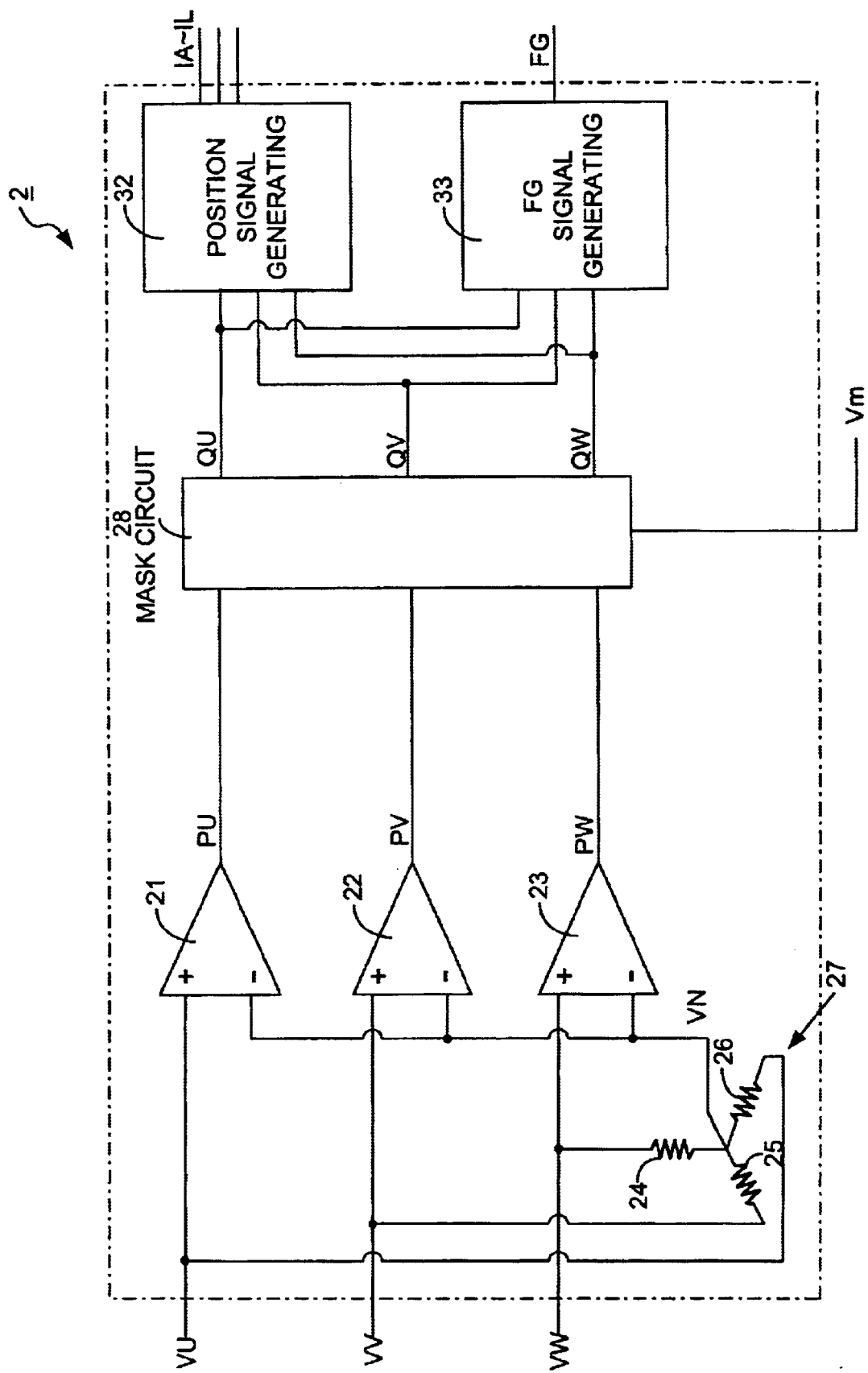
FIG. 8 is a block circuit diagram of the comparator circuit shown in FIG. 7.

Numeral 2 indicates a comparator circuit and includes three comparators 21, 22 and 23, as shown in FIG. 8. The comparator circuit 2 serves to compare the induction voltages VU, VV and VW with a mid-point voltage VN (serving as a standard voltage) and to thereby generate rectangular wave signals PU, PV and PW synchronized with the rotation of the motor. Explained more in detail, the induction voltages VU, VV and VW are applied respectively to the non-inversion input terminals of these three comparators 21, 22 and 23 and the common mid-point voltage VN is inputted to their inversion input terminals. The mid-point voltage VN is the voltage at the junction point to which is connected one end of each of three resistors 24, 25 and 26 forming together a mid-voltage generating part 27. The induction voltages VU, VV and VW are applied respectively to the other ends of these resistors 24, 25 and 26. The waveform of the mid-point voltage VN is shown in FIG. 11 by broken lines. The waveforms of the rectangular wave signals PU, PV and PW outputted from the comparators 21, 22 and 23 are also shown in FIG. 11 and include noise.

Figure 12:
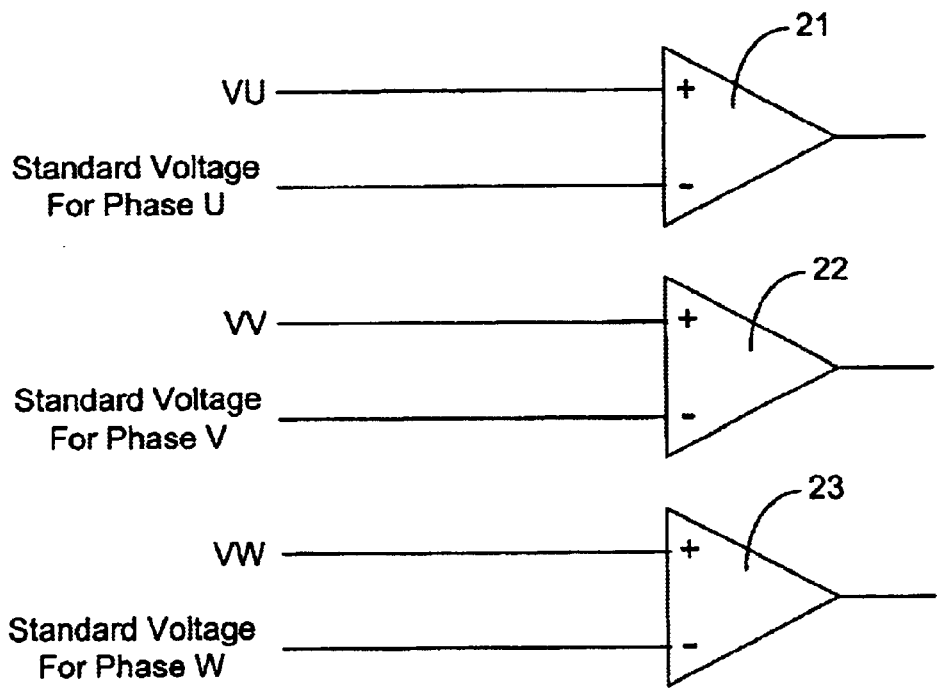
FIG. 12 shows the structure of a prior art comparator.

With a prior art comparator circuit, as shown in FIG. 12, the output voltages VU, VV and VW of the three phases U, V and W were each compared with a different standard voltage corresponding to its phase and hence the variations among the phases were large. In the comparator circuit 2 according to the present invention, by contrast, the mid-point voltage VN corresponding to the mid-point voltage of the motor is generated inside the comparator circuit 2 for use as a common standard voltage to be shared among the three comparators 21, 22 and 23. Thus, variations among the three phases U, V and W are reduced, and the motor can be operated in a more stable manner. Hysteresis may be provided to this standard voltage.

The rectangular wave signals PU, PV and PW, outputted from the individual comparators 21, 22 and 23, are transmitted to a mask circuit 28. The mask circuit 28 serves to carry out a masking procedure on the rectangular wave signals PU, PV and PW by using a noise mask signal Vm generated by a mask signal generating circuit 9, to be described below, to remove the noise from the wave signals PU, PV and PW and to output noise-free rectangular wave signals QU, QV and QW to a position detection signal generating part 32 and an FG signal generating part 33. The waveforms of the noise-free rectangular wave signals QU, QV and QW are shown in FIG. 11.

The mask circuit 28 serves to mask the signals PU, PV and PW if the noise mask signal Vm is LOW and to pass the signals PU, PV and PW if the noise mask signal Vm is HIGH. As a result, it is the noise-free signals QU, QV and QW that are inputted to the position detection signal generating part 32 and the FG signal generating part 33.

The position detection signal generating part 32 serves to generate position detection signals IA-IL on the basis of the rectangular wave signals QU, QV and QW and to output these position detection signals IA-IL to a drive signal synthesizing circuit 10. These position detection signals IA and IL change according to the angular position of the motor (phase). Their waveforms are shown in FIG. 11.

The FG signal generating part 33 serves to generate FG signal and to transmit the generated FG signal to a triangular wave generating circuit 7. The FG signal is generated from the signals QU, QV and QW, obtained by removing noise from the signals PU, PV and PW, and is switched between HIGH and LOW levels whenever any of the signals QU, QV and QW undergoes inversion. The FG signal serves to indicate the speed of rotation of the motor 3, and its waveform is shown in FIG. 11. It may be used by a servo mechanism (not shown), for example, provided for stabilizing the rotary motion of the motor 3.

Figure 9:
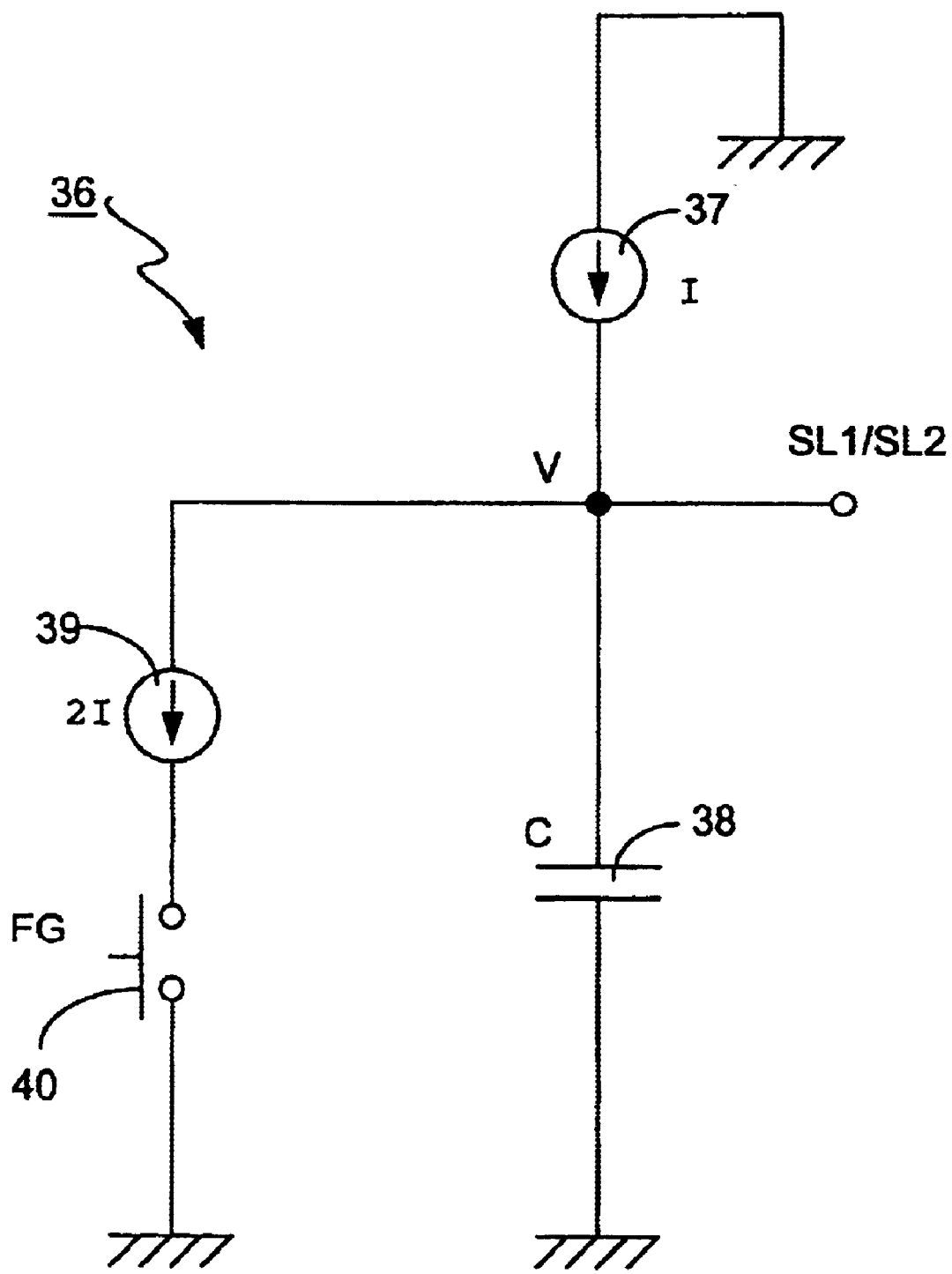
FIG. 9 is a circuit diagram of a charge-discharge circuit in the triangular wave generating circuit shown in FIG. 7.

The triangular wave generating circuit 7 serves to generate two triangular signals SL1 and SL2 on the basis of the FG signal and is provided with two charge-discharge circuits 36 which are each formed with two constant current sources 37 and 39, a capacitor 38 (with capacitance C) and a switch 40, as shown in FIG. 9. In each of these charge-discharge circuits 36, the (first) constant current source 37 (for constant current I) and the capacitor 38 are connected in series and the series connection of the (second) constant current source 39 (for constant current 2I) and the switch 40 is connected to the capacitor 38 in parallel. When the switch 40 is opened to charge the capacitor 38, the voltage V of the upper electrode (with reference to FIG. 9) of the capacitor 38 increases linearly with time t as follows:

$$V=(It/C)+\text{constant}.$$

When the switch 40 is closed to discharge the capacitor 38, the voltage V decreases linearly as follows:

$$V=\{(I-2I)t/C\}+\text{constant}=-(It/C)+\text{constant}.$$

Thus, a triangular wave signal can be outputted by opening and closing the switch 40 repeatedly at a fixed period.

Figure 10:
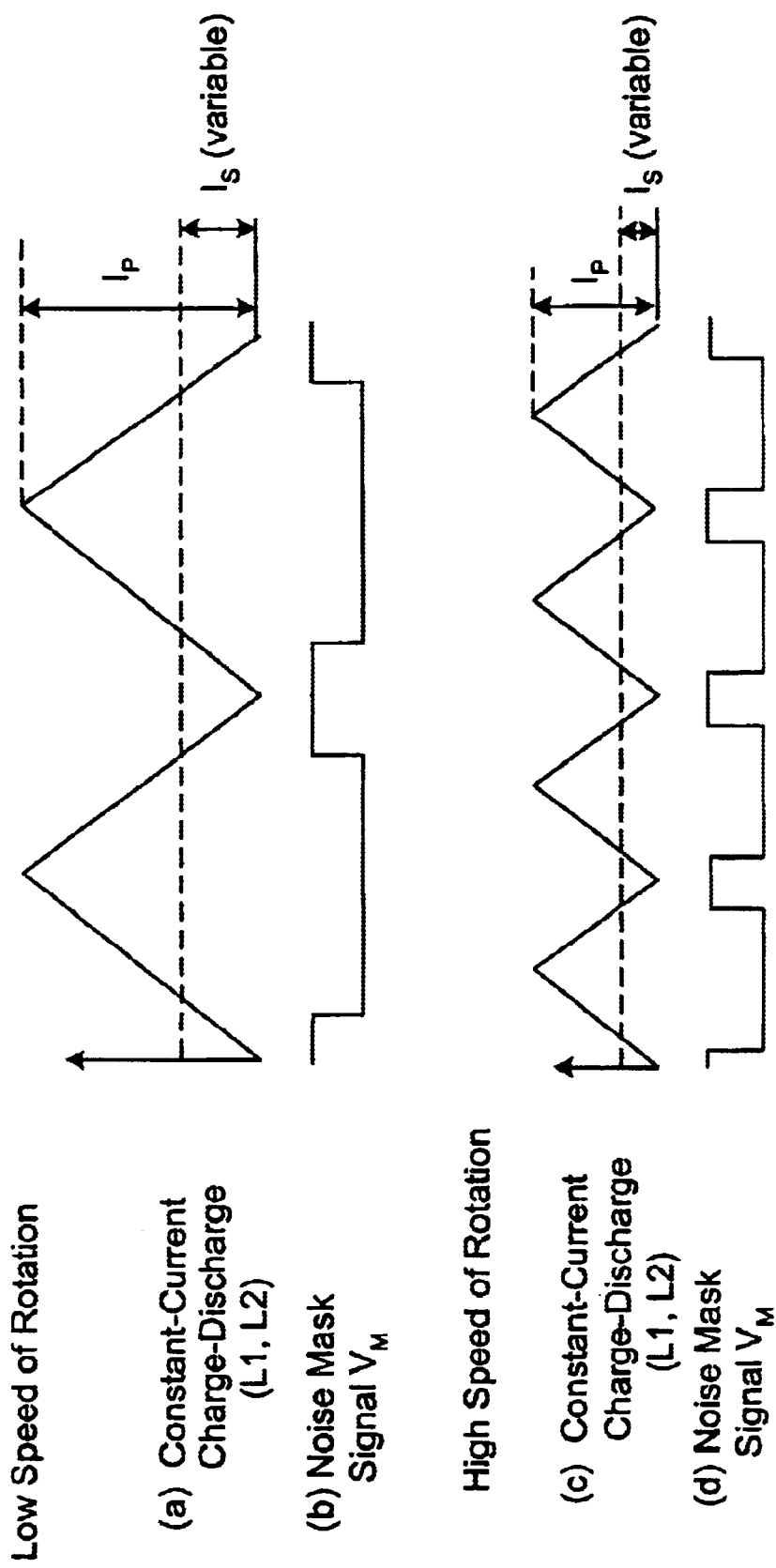
FIG. 10 is a drawing of the constant current charge-discharge waveform and the mask signal when the speed of rotation of the motor is fast and slow.

The switch 40 may comprise a switching transistor. In one of the charge-discharge circuits 36, the switch 40 is opened if the FG signal is HIGH and closed if the FG signal is LOW so as to generate the triangular wave signal SL1 as shown in FIG. 11. In the other of the charge-discharge circuits 36, the switch 40 is closed if the FG signal is HIGH and opened if the FG signal is LOW so as to generate the triangular wave signal SL2 as shown also in FIG. 11. Thus, the two triangular wave signals SL1 and SL2 have the same period and opposite to each other in phase. Their period will become shorter if the speed of rotation of the motor is increased and the period of the FG signal becomes shorter. As shown in FIG. 10 (as converted into current waveform), however, the rate of change in voltage remains the same even if the period may be change, and the waveform remains similar (not in the sense of the expression used in geometry) while the period may change.

The triangular wave signals SL1 and SL2 are outputted from the triangular wave generating circuit 7 as voltage signals. They are converted into current signals L1 and L2 through a V/I conversion circuit 8 and are transmitted to a drive signal synthesizing circuit 10 and a mask signal generating circuit 9.

As the triangular current wave signals L1 and L2 are received from the V/I conversion circuit 8, the mask signal generating circuit 9 serves to generate a standard current value $I_S$ from these signals L1 and L2. As shown in FIG. 10, this standard current value $I_S$ is obtained by dividing the peak-to-peak current value (amplitude) $I_P$ of the triangular signal L1 or L2 at a specified ratio n:1, that is, $I_S=I_P/n$ where n is a positive real number. Next, the triangular signals L1 and L2 are compared with the standard current value $I_S$. If either of the triangular signals L1 and L2 is larger than the standard current value $I_S$, the noise mask signal Vm is made LOW. If both of the triangular signals L1 and L2 are smaller than the standard current value $I_S$, the noise mask signal Vm is made HIGH. The noise mask signal Vm, thus obtained, is shown in FIG. 11. FIG. 11 shows that the noise mask signal Vm becomes LOW at the same timing as the occurrence of noise (as included, say, in the wave signals PU, PV and PW). The noise mask signal Vm is used in the comparator circuit 2 for removing noise.

Since the mask signal generating circuit 9 varies the standard current value $I_S$ in proportion with the peak-to-peak value $I_P$ of the triangular wave signals L1 and L2, both the noise mask time and the position detection time (the time period between two consecutive noise mask times) vary according to the speed of rotation of the motor. Since the noise mask time changes with the speed of rotation of the motor more gently than if the standard current value VS were kept invariable as in the prior art technology, it is less likely for the noise mask time to become shorter than the width of the noise if the ratio n is appropriately selected even when the speed of rotation of the motor is increased.

The drive signal synthesizing circuit 10 serves to combine the position detection signals IA-IL and the triangular wave signals L1 and L2 to synthesize and output drive signals DUU, DVU, DWU, DUL, DVL and DWL, as shown in FIG. 11.

In FIG. 7, numeral 11 indicates a current supplying means comprising six NPN-type power transistors T1–T6 each adapted to be switched on and off under the control of the drive signals DUU, DVU, DWU, DUL, DVL and DWL.

The collector of a first power transistor T1 is connected to the positive terminal of a cell 12 and its emitter is connected to the collector of a second power transistor T2. The base of the first power transistor T1 is adapted to have the drive signal DUW inputted. The emitter of the second power transistor T2 is grounded through a resistor 29 and its base is adapted to have the drive signal DUL inputted. A midpoint in the connection between the power transistors T1 and T2 is connected to the coil 4 for phase U of the brushless motor 3 through a terminal of the current supplying means 11.

Similarly, the collector of a third power transistor T3 is connected to the positive terminal of the cell 12 and its emitter is connected to the collector of a fourth power transistor T4. The base of the third power transistor T3 is adapted to have the drive signal DVU inputted. The emitter of the fourth power transistor T4 is grounded through the resistor 29 and its base is adapted to have the drive signal DVL inputted. A mid-point in the connection between the power transistors T3 and T4 is connected to the coil 5 for phase V of the brushless motor 3 through a terminal of the current supplying means 11.

Similarly further, the collector of a fifth power transistor T5 is connected to the positive terminal of the cell 12 and its emitter is connected to the collector of a sixth power transistor T6. The base of the fifth power transistor T5 is adapted to have the drive signal DWU inputted. The emitter of the sixth power transistor T6 is grounded through the resistor 29 and its base is adapted to have the drive signal DWL inputted. A mid-point in the connection between the power transistors T5 and T6 is connected to the coil 6 for phase W of the brushless motor 3 through a terminal of the current supplying means 11.

From the current supplying means 11 thus structured and controlled by the drive signals DUU, DVU, DWU, DUL, DVL and DWL, noise-free U-phase, V-phase and W-phase currents as shown in FIG. 11 flow through the coils 4, 5 and 6 of the brushless motor 3, for example, according to a 150° current-passing mode of operation. The triangular wave signals L1 and L2, being outputted from the V/I conversion circuit 8 to the drive signal synthesizing circuit 10, determine the slope of the gradually changing portions of the U-phase, V-phase and W-phase currents. If the slope of the triangular wave signals L1 and L2 is small, the slope of the changing portions of the U-phase, V-phase and W-phase currents is also small and the noise of the motor becomes smaller.

Figure 13:
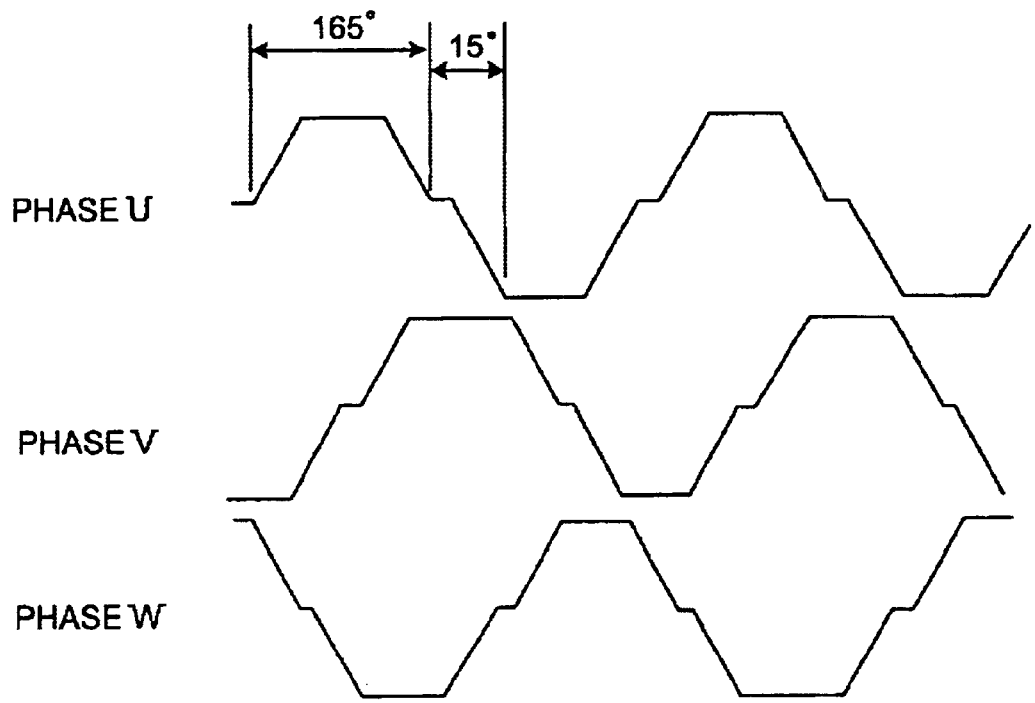
FIG. 13 is a waveform diagram of a three-phase motor in a 165° current-passing mode of operation.
Figure 14:
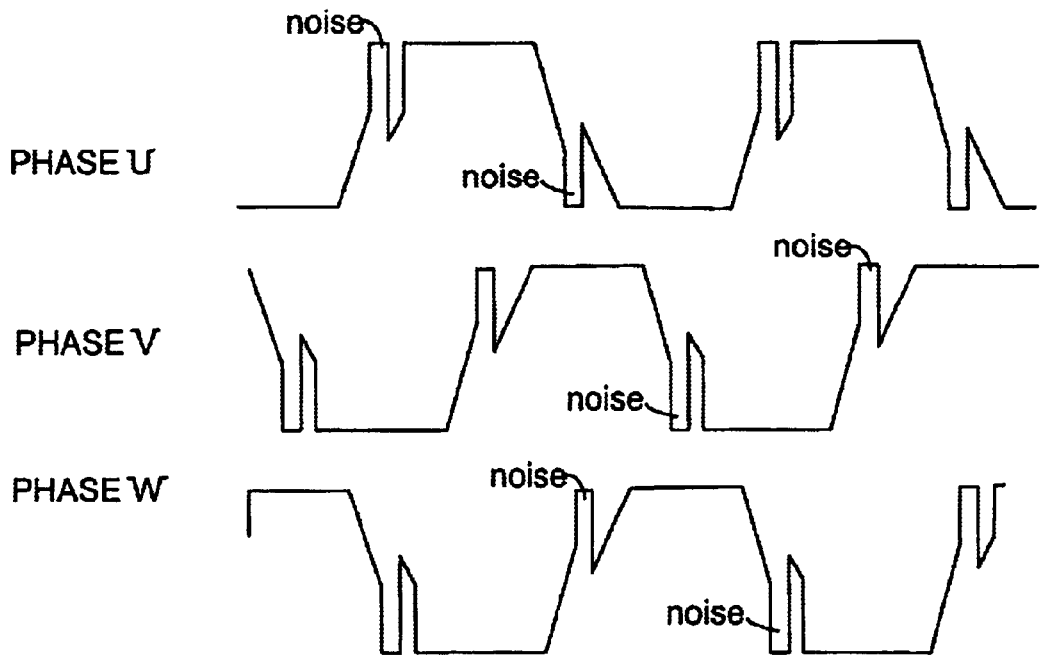
FIG. 14 is a waveform diagram of noise generated in a three-phase waveform in the 165° current-passing mode of operation.

A motor driver embodying this invention can be used also in a 165° current-passing mode of operation as shown in FIGS. 13 and 14 since the noise mask time and the position detection time can be changed gradually according to the speed of rotation of the motor. In other words, the present invention can provide quieter motors with smaller noise.

Figure 15:
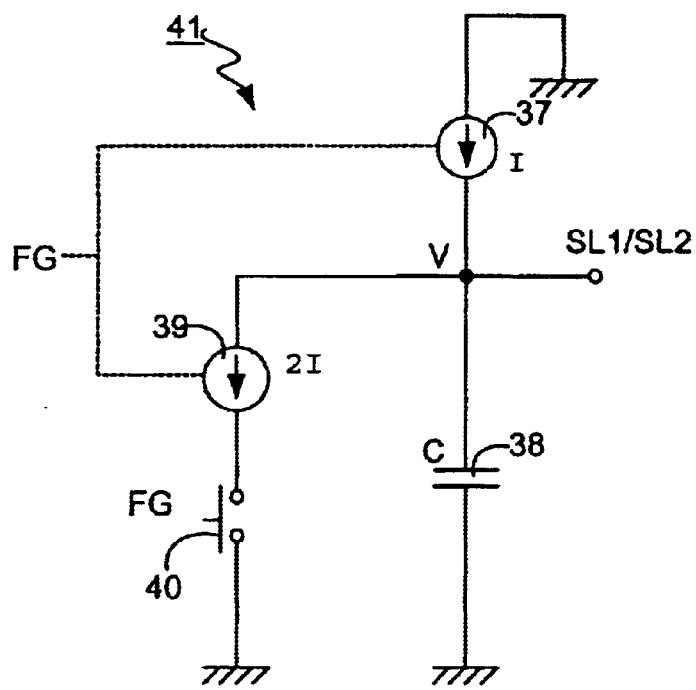
FIG. 15 is a circuit diagram of another charge-discharge circuit according to a second embodiment of the invention.
Figure 16:
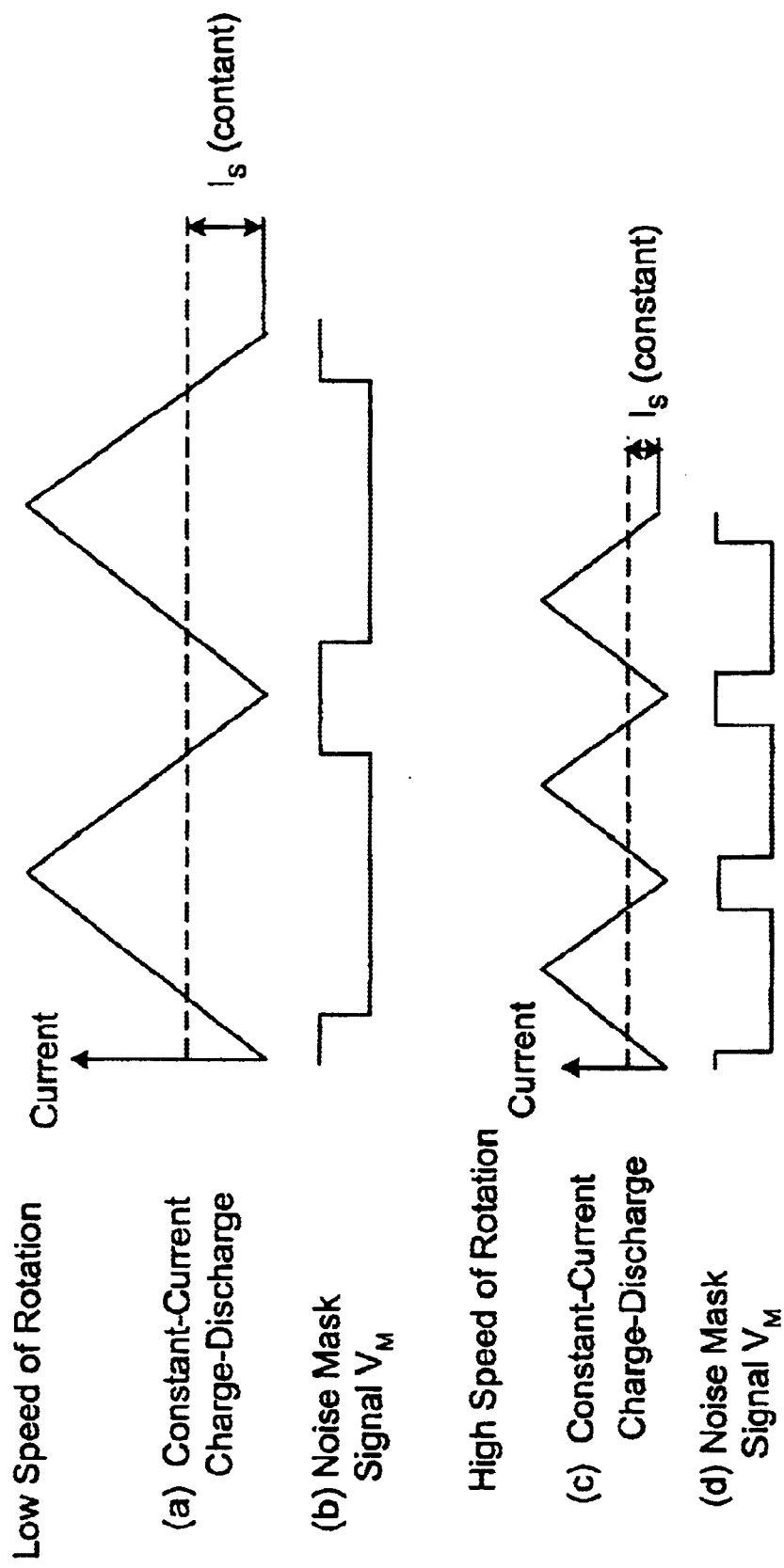
FIG. 16 is a drawing of the constant current charge-discharge waveform and the mask signal according to the second embodiment of the invention when the speed of rotation of the motor is fast and slow.

FIG. 15 shows the structure of another charge-discharge circuit 41 which may be used in the triangular wave generating circuit according to a second embodiment of the invention. Although the charge-discharge circuit according to the first embodiment of the invention carries out charging and discharging at a fixed current value, the current values I and 2I of the constant current sources 37 and 39 for the charge-discharge circuit 41 are variable according to the second embodiment of the invention, depending on the speed of rotation of the motor 3. Explained more in detail, the speed of rotation of the motor 3 is detected from the FG signal, and the current values I and 2I are increased if the speed of rotation of the motor 3 becomes faster and are decreased if the speed of rotation of the motor 3 becomes slower.

As a result, the changes in the triangular wave signals SL1 and SL2 become gentler if the speed of rotation of the motor 3 is slow but the changes in the triangular wave signals SL1 and SL2 become more abrupt as the speed of rotation of the motor 3 becomes faster. Thus, although the standard current value $I_S$ is unchanged, the noise mask time and the position detecting time are both varied according to the speed of rotation of the motor 3 and their changes are more gentle than according to the prior art technology. Other desirable effects of the present invention described above are attainable also with the second embodiment of the invention.

Figure 17A:
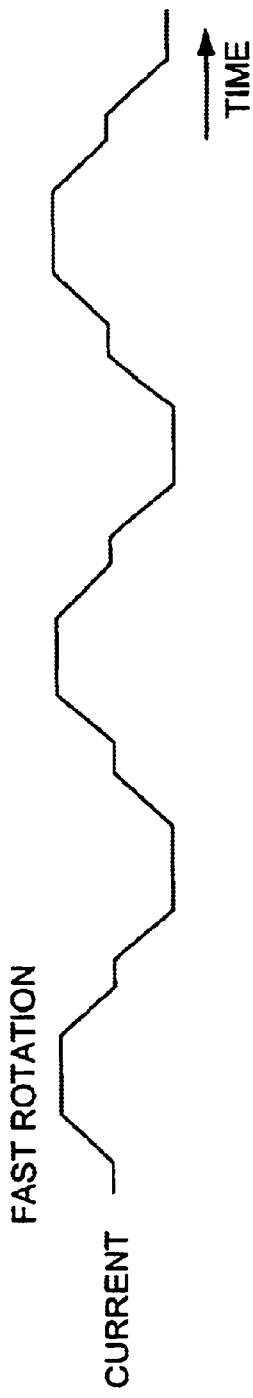
FIGS. 17A and 17B are waveforms of the U-phase current when the speed of rotation of the motor is fast and slow, respectively.
Figure 17B:
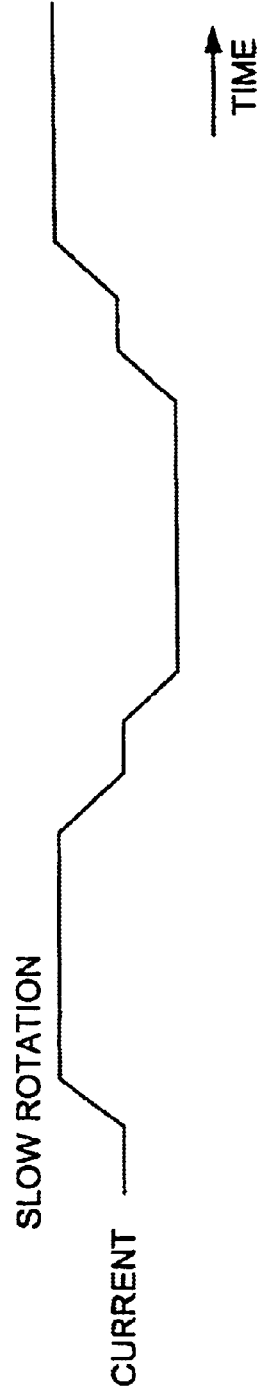
Figure 17C:
FIG. 17C is the waveform of FIG. 17B shortened in the direction of the time-axis.
Figure 18A:
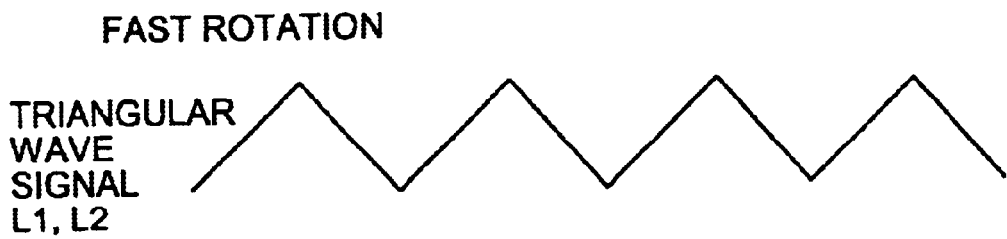
FIGS. 18A, 18B, 18C and 18D, together referred to as FIG. 18, show the triangular wave signal and the coil current when the speed of rotation of the motor is fast and slow.
Figure 18B:
Figure 18C:
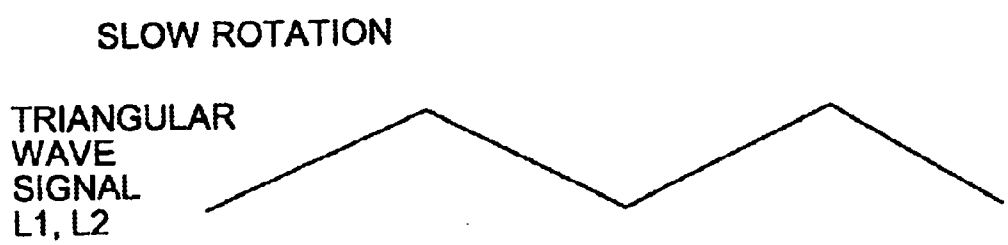
Figure 18D:

With the first embodiment of the invention described above, the frequency values of the triangular wave signals L1 and L2 vary as the speed of rotation of the motor is changed because the drive signals DUU, DVU, DWU, DUL, DVL and DWL are synthesized from the combinations of the position detection signals IA-IL and the triangular wave signals L1 and L2 but the slope of their gradually changing portions is constant, being equal to that of the triangular wave signals L1 and L2. As a result, the slope of the changing portions of the currents through the coils 4, 5 and 6 of the motor becomes relatively large if the speed of rotation of the motor is made small and the waveform approaches a rectangle, as shown in FIGS. 17A and 17B. In other words, as the speed of rotation of the motor becomes smaller, the period of the U-phase, V-phase and W-phase currents becomes larger but the slope of their changing portions is the same. If the waveform of FIG. 17B is truncated by shortening it in the direction of the time-axis to obtain FIG. 17C such that its period will become equal to that corresponding to FIG. 17A, it can be seen that the waveform which is obtained in FIG. 17C is substantially approaching that of a rectangle. This may cause an increase in the noise of the motor 3.

In view of the above, the slope (or the rate of change) of the triangular wave signals L1 and L2 is made smaller according to a third embodiment of the invention, as the speed of rotation of the motor 3 becomes slower. As a result, the slope of the changing portions of the triangular wave signals L1 and L2 becomes smaller as the speed of rotation of the motor 3 is reduced and hence the slope of the changing portions of the U-phase, V-phase and W-phase currents through the coils 4, 5 and 6 also becomes gentler. In other words, the current waveforms remain similar in shape although the speed of rotation of the motor may change and the noise of the motor 3 can be prevented from becoming large.

In summary, motor drivers embodying this invention are characterized as being capable of gradually changing the noise mask time and the position detection time according to the speed of rotation of the motor. As a result, the noise mask time is prevented from becoming suddenly too short as the speed of rotation of the motor is increased and it becomes easier to remove the noise in the motor.

The invention has been described above by way of only a few embodiments. These embodiments, however, are not intended to limit the scope of the invention. Many modifications and variations are possible within the scope of the invention. For example, what has been herein referred to as the triangular wave signal need not be strictly triangular in shape as shown in the figures but a portion of a generally triangular shape may be missing such that the waveform shows a trapezoidal wave. For this reason, what has been referred to as the triangular wave signal may also be referred to as the sloped wave signal and the means for generating triangular wave signals as the sloped wave signal generating means. In summary, the disclosure intended to be interpreted broadly.

What is claimed is:

1. A motor driver for driving a three-phase motor having coils, said motor driver comprising:

a synchronized signal generating means for generating synchronized signals with the rotation of said motor by comparing each of induction voltages generated in said coils with a specified standard voltage;

a sloped wave signal generating means for generating from said synchronized signals a sloped wave signal with a waveform including sloped portions, the frequency of said sloped wave signal increasing as said motor rotates faster;

a noise mask signal generating means for varying a standard value according to a change in the amplitude of said sloped wave signal and generating a noise mask signal by comparing said standard value with said sloped wave signal;

a noise mask means for removing noise from said synchronized signals by using said noise mask signal; and a current supplying means for supplying currents to said coils of said motor by using said synchronized signals from which noise has been removed by said noise mask means.

2. The motor driver of claim 1 wherein said standard value is kept at a fixed ratio with the amplitude of said sloped wave signal.

3. The motor driver of claim 1 wherein said synchronized signal generating means compares each of said induction voltages with a single common specified threshold voltage.

4. The motor driver of claim 1 wherein each of said currents supplied to said coils changes linearly with time at a constant rate over portions of time, said constant rate becoming smaller if said motor rotates more slowly.

5. A motor driver for driving a three-phase motor having coils, said motor driver comprising:

a synchronized signal generating means for generating synchronized signals with the rotation of said motor by comparing each of induction voltages generated in said coils with a specified standard voltage;

a sloped wave signal generating means for generating from said synchronized signals a sloped wave signal with a waveform including sloped portions, both the frequency and the rate of change of said sloped wave signal increasing as said motor rotates faster;

a noise mask signal generating means for generating a noise mask signal by comparing said sloped wave signal with a specified standard value;

a noise mask means for removing noise from said synchronized signals by using said noise mask signal; and a current supplying means for supplying currents to said coils of said motor by using said synchronized signals from which noise has been removed by said noise mask means.

* * * * *